United States Patent [19]

Chenevard et al.

[11] 4,154,157

[45] May 15, 1979

[54] MACHINE FOR JOINING SEPARATE PRODUCTS INTO A SANDWICH

[75] Inventors: Alexis Chenevard; Hugues André, both of Morges, Switzerland

[73] Assignee: Sapal Société Anonyme des Plieuses Automatiques, Ecublens, Switzerland

[21] Appl. No.: 901,809

[22] Filed: May 1, 1978

[30] Foreign Application Priority Data

Jul. 13, 1977 [CH] Switzerland .................. 8681/77

[51] Int. Cl.² ........................ A21C 9/08; A23P 1/00
[52] U.S. Cl. ........................... 99/450.4; 53/544; 198/418
[58] Field of Search .............. 99/450.4; 198/418, 425; 53/147, 158, 531, 542, 544

[56] References Cited

U.S. PATENT DOCUMENTS

| 1,773,031 | 8/1930 | Crescio | 99/450.4 |
| 1,829,322 | 10/1931 | Williams | 198/418 |
| 2,923,257 | 2/1960 | Monaco | 99/450.4 |
| 3,119,353 | 1/1964 | Roehn, Jr. | 99/450.4 |
| 3,316,860 | 5/1967 | Peterson | 99/450.4 |
| 3,527,366 | 9/1970 | Gamberini | 198/418 X |

*Primary Examiner*—Stanley N. Gilreath
*Attorney, Agent, or Firm*—Stevens, Davis, Miller & Mosher

[57] ABSTRACT

A machine for joining separate products, such as biscuits or chocolates, into a sandwich comprises a drum having a series of pairs of sleeves with open inlet and outlet ends, the cross-section of the sleeves corresponding to the cross-section of the products, and one sleeve of each pair being fixed to the drum and the other sleeve of each pair being hinged to the fixed sleeve and movable between a position in which it bears against the drum and a folded position in which it bears against and is radially outwardly of the fixed sleeve. The drum is rotated so as to present to products brought in succession by a conveyor the inlet opening of a fixed sleeve and then the inlet opening of a hinged sleeve in the unfolded condition. The hinged sleeve is then rotated to its folded position and the products ejected from the adjacent sleeves of a pair in a sandwich to another conveyor.

5 Claims, 1 Drawing Figure

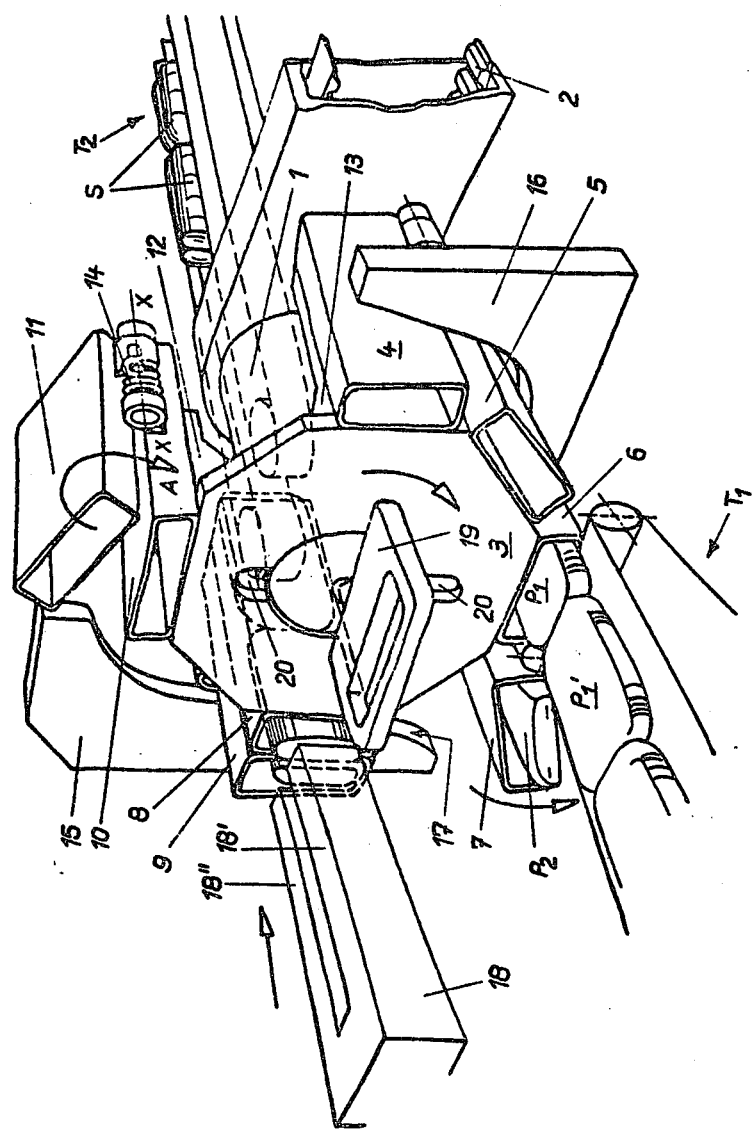

MACHINE FOR JOINING SEPARATE PRODUCTS INTO A SANDWICH

The present invention relates to a machine for joining separate products into a sandwich.

The invention is particularly concerned with machines of the type comprising first conveying means for bringing the products intermittently one after another in a first plane, and second conveying means for conveying the formed sandwiches in a second plane towards a station for subsequent processing. The planes are in practice horizontal.

An object of the invention is to provide a machine of this type which enables products to be joined rapidly into a sandwich without damaging the products.

In order to be able to achieve this aim, the present invention provides a machine for joining separate products into a sandwich, comprising joining means for bringing said products together, first conveying means for bringing the products intermittently one after another in a first plane to said joining means, and second conveying means for conveying the sandwiches in a second plane from said joining means towards a station for subsequent processing, wherein said joining means comprises a drum, a series of pairs of sleeves carried on the periphery of said drum at regular intervals, said sleeves being of a cross-section which corresponds generally with the general shape of said products and having an inlet opening and an outlet opening, one sleeve of each pair being fixed to said drum and the other sleeve of each pair being hinged to said fixed sleeve along an axis parallel with the axis of said drum, means for rotating said drum in stepwise manner so as to present in succession the inlet opening of one sleeve of a pair to at least one product brought by said first conveying means and then the inlet opening of the other sleeve of that pair to the next product, means for rotating, during rotation of the drum, said hinged sleeve of a pair thus filled into a folded condition against said fixed sleeve of that pair, ejecting means arranged to reciprocate to push said products from the sleeves of a pair through said outlet opening of each sleeve towards the second conveying means when said drum is stationary, and means for rotating said hinged sleeve of a pair thus emptied, in a direction away from the fixed sleeve of that pair, until it rests against the periphery of said drum.

It is advantageous to provide means for holding the hinged sleeves back against the periphery of the drum, the holding means being arranged along a lower portion of the drum in a sector which finishes in the direction of rotation of the drum, opposite the first conveying means.

A machine in accordance with the invention for joining separate products into a sandwich will now be described, by way of example, with reference to the accompanying drawing which shows a perspective view of the machine.

The illustrated machine enables two separate products P1, P2 or P1', P2', which may for example be biscuits or chocolates, to be joined into a sandwich. A conveyor $T_1$ brings the products intermittently to the machine one after another in a first plane, which in practice is horizontal, and a conveyor $T_2$ distributes the completed sandwiches S in a second plane, which in practice is also horizontal, to a station (not shown) for subsequent processing.

A drum 1 is rotatably driven stepwise by a toothed belt 2 and is equipped with an octagonal cheek 3 having around its periphery a series of pairs of sleeves 4, 5; 6,7; 8,9 and 10,11, one sleeve being located on each edge of the cheek. The rectangular cross-section of each sleeve corresponds generally with the shape of the products coming from the conveyor $T_1$. Support members, two of which are shown at 12 and 13, are integral with the cheek 3 and support the corresponding sleeves, the illustrated support members 12 and 13 supporting the sleeves 10 and 4 respectively.

Each pair of sleeves includes one sleeve 4,6,8 and 10 fixed to the drum and one sleeve 5,7,9 and 11 hinged to the corresponding fixed sleeve along an axis x—x parallel with the axis of the drum 1. The hinging of each pair of sleeves includes a torsion spring 14 which tends to open or unfold the pair of sleeves as shown by the arrow A for the sleeves 10 and 11, the sleeve 11 locating itself against the corresponding free edge of the octagonal cheek 3.

Guide or holding members 15 and 16 are arranged on each side of the drum 1. The guide member 15 rotates or tilts the sleeve 7 into the folded position when this sleeve engages a rounded portion 17 of the member 15 during the step-by-step rotation of the drum 1.

The guide member 16 holds the sleeve 5 against the periphery of the cheek 3 and is arranged along the bottom portion of the drum in a sector which finishes, in the direction of rotation of the drum, opposite the conveyor $T_1$. The sleeve 5 is thus brought into the horizontal position with its inlet opening facing the conveyor $T_1$ for receiving one or more products. At the next step it is the inlet opening of the sleeve 4 which aligns with the conveyor $T_1$ to receive the next product or products.

An ejector 18 is arranged horizontally at the height of the sleeves 8 and 9 which are held side by side in folded condition by the guide member 15 and which contain the products ready to be joined into a sandwich. The ejector 18 has two fingers 18' and 18" which are used to push the products in the sleeves 8 and 9 through the outlet opening of each of those sleeves towards the conveyor $T_2$ when the drum 1 is stationary.

The cheek 3 is held removably against the drum by a key 19 which is integral with the shaft of the drum 1 and which when it is brought into the vertical position opposite an elongate opening 20 in the cheek 3 enables the cheek to be freed for dismantling or to permit its replacement with a cheek of different shape or size.

The above-described machine enables the products to be joined rapidly into a sandwich without damaging the product.

We claim:

1. A machine for joining separate products into a sandwich, comprising joining means for bringing said products together, first conveying means for bringing the products intermittently one after another in a first plane to said joining means, and second conveying means for conveying the sandwiches in a second plane from said joining means towards a station for subsequent processing, wherein said joining means comprises a drum, a series of pairs of sleeves carried on the periphery of said drum at regular intervals, said sleeves being of a cross-section which corresponds generally with the general shape of said products and having an inlet opening and an outlet opening, one sleeve of each pair being fixed to said drum and the other sleeve of each pair being hinged to said fixed sleeve along an axis parallel with the axis of said drum, means for rotating said drum in stepwise manner so as to present in succession the inlet opening of one sleeve of a pair to at least one product brought by said first conveying means and then the inlet opening of the other sleeve of that pair to the next product, means for rotating, during rotation of the drum, said hinged sleeve of a pair thus filled into a folded condition against said fixed sleeve of that pair, ejecting means arranged to reciprocate to push said products from the sleeves of a pair through said outlet opening of each sleeve towards the second conveying means when said drum is stationary, and means for rotating said hinged sleeve of pair thus emptied, in a direction away from the fixed sleeve of that pair, until it rests against the periphery of said drum.

2. A machine according to claim 1, including holding means for holding said hinged sleeves against the periphery of said drum, said holding means being arranged along a lower portion of said drum in a sector which finishes, in the direction of rotation of the drum, opposite said first conveying means.

3. A machine according to claim 1, including holding means for holding said hinged sleeves in said folded condition, said holding means being arranged along an upper portion of the drum in a sector which finishes, in the direction of rotation of the drum opposite said second conveying means.

4. A machine according to claim 2, including holding means for holding said hinged sleeves in said folded condition, said holding means being arranged along an upper portion of the drum in a sector which finishes, in the direction of rotation of the drum opposite said second conveying means.

5. A machine according to claim 1, wherein said drum has a polygonal member and said sleeves are arranged respectively against the edges of the polygonal member.

* * * * *